US012655546B2

(12) United States Patent
Uno et al.

(10) Patent No.:  US 12,655,546 B2
(45) Date of Patent:       Jun. 16, 2026

(54) SENSING FIBER MEMBER

(71) Applicants:Asahi Kasei Advance Corporation, Tokyo (JP); Osaka Research Institute of Industrial Science and Technology, Osaka (JP); Kaji Nylon .Inc, Ishikawa (JP)

(72) Inventors: Mayumi Uno, Osaka (JP); Mariko Omori, Osaka (JP); Shigeru Morita, Tokyo (JP); Kansei Yoshimura, Ishikawa (JP)

(73) Assignees: Asahi Kasei Advance Corporation, Tokyo (JP); Osaka Research Institute of Industrial Science and Technology, Osaka (JP); Kaji Nylon, Inc., Ishikawa (JP)

( * ) Notice: Subject to any disclaimer, the term of this patent is extended or adjusted under 35 U.S.C. 154(b) by 0 days.

(21) Appl. No.: 18/268,341

(22) PCT Filed: Dec. 23, 2021

(86) PCT No.: PCT/JP2021/048008
§ 371 (c)(1),
(2) Date: Jun. 20, 2023

(87) PCT Pub. No.: WO2022/138862
PCT Pub. Date: Jun. 30, 2022

(65) Prior Publication Data
US 2024/0035209 A1       Feb. 1, 2024

(30) Foreign Application Priority Data
Dec. 23, 2020    (JP) ................................. 2020-213589

(51) Int. Cl.
D02G 3/36          (2006.01)
D02G 3/28          (2006.01)
(Continued)

(52) U.S. Cl.
CPC ................. D02G 3/36 (2013.01); D02G 3/28 (2013.01); D02G 3/441 (2013.01); G01L 1/14 (2013.01); G01L 1/20 (2013.01)

(58) Field of Classification Search
CPC ........... D02G 3/28; D02G 3/44; D03D 15/533
(Continued)

(56) References Cited

U.S. PATENT DOCUMENTS 3,683,309  A  *   8/1972  Hirose ................. H01B 7/0054
                                                                    338/214
6,734,404  B2 *  5/2004  Hays ........................ H05B 3/56
                                                                    219/528

(Continued)

FOREIGN PATENT DOCUMENTS

EP           3467169  A1      4/2019
JP      H01-127715  A       5/1989
(Continued)

OTHER PUBLICATIONS

Supplementary European Search Report issued in European Patent Application No. 21911001.2 dated Jun. 10, 2024.
(Continued)

*Primary Examiner* — Bao-Thieu L Nguyen
(74) *Attorney, Agent, or Firm* — Morgan, Lewis & Bockius LLP

(57)                    ABSTRACT

Provided is a sensing fiber member which can be processed in long lengths, which excels in mass production, which is supple and has an excellent texture, and which is much less costly than a contact sensing fiber member (a piezoelectric yarn) for which a conventional piezoelectric material is used. This sensing fiber member has at least two covering yarns for which covering is achieved by wrapping an insulating fiber serving as a covering material in one direction around a linear conductor constituting a core material,
(Continued)

two of the covering yarns being arranged close to each other. The sensing fiber member is characterized by reading changes in resistance and/or changes in capacitance between the linear conductors of the two covering yarns arranged close to each other.

18 Claims, 7 Drawing Sheets

(51) Int. Cl.
    *D02G 3/44*       (2006.01)
    *G01L 1/14*       (2006.01)
    *G01L 1/20*       (2006.01)
(58) Field of Classification Search
    USPC ........................................................ 57/236
    See application file for complete search history.

(56)              References Cited

U.S. PATENT DOCUMENTS

| | | | |
|---|---|---|---|
| 7,987,659 B2 * | 8/2011 | Song | H05B 3/56 |
| | | | 57/236 |
| 10,754,486 B2 * | 8/2020 | Cobanoglu | G06F 3/04164 |
| 10,829,870 B2 * | 11/2020 | Carlsson | D02G 3/12 |
| 11,101,427 B2 * | 8/2021 | Tanimoto | A61B 5/02444 |
| 2002/0130624 A1 * | 9/2002 | Nakamura | H05B 33/00 |
| | | | 315/56 |
| 2006/0148351 A1 | 7/2006 | Tao et al. | |
| 2009/0188231 A1 * | 7/2009 | Song | H05B 3/56 |
| | | | 29/611 |
| 2013/0090030 A1 * | 4/2013 | Van De Vyver | D06M 15/53 |
| | | | 428/221 |
| 2013/0158895 A1 | 6/2013 | Bessho et al. | |
| 2013/0196561 A1 * | 8/2013 | Shibata | D03D 15/41 |
| | | | 442/76 |
| 2014/0170919 A1 | 6/2014 | Manipatruni et al. | |
| 2015/0280102 A1 * | 10/2015 | Tajitsu | G06F 3/0414 |
| | | | 310/338 |
| 2016/0145776 A1 * | 5/2016 | Roh | D02G 3/26 |
| | | | 57/220 |
| 2016/0284436 A1 | 9/2016 | Fukuhara et al. | |
| 2017/0224280 A1 | 8/2017 | Bozkurt et al. | |
| 2018/0087193 A1 * | 3/2018 | Fu | A61B 5/742 |
| 2018/0096799 A1 * | 4/2018 | Chen | H01G 11/34 |
| 2018/0195985 A1 * | 7/2018 | Nebuya | D02G 3/441 |
| 2019/0003905 A1 * | 1/2019 | Yoshida | H10N 30/857 |
| 2019/0072440 A1 * | 3/2019 | Menon | D03D 1/0088 |
| 2019/0184750 A1 * | 6/2019 | Sasaki | D06M 13/127 |
| 2019/0354242 A1 * | 11/2019 | Cobanoglu | G06F 3/04164 |
| 2020/0058844 A1 * | 2/2020 | Tanimoto | H10N 30/20 |
| 2020/0199790 A1 * | 6/2020 | Hayashi | D02G 3/04 |
| 2020/0362484 A1 | 11/2020 | Kanematsu et al. | |
| 2020/0362485 A1 | 11/2020 | Kanematsu et al. | |
| 2021/0244333 A1 | 8/2021 | Koga et al. | |
| 2021/0251309 A1 * | 8/2021 | Tang | A61B 5/27 |
| 2022/0343123 A1 * | 10/2022 | Hagihara | D02G 3/441 |
| 2023/0037131 A1 * | 2/2023 | Tomoda | D02G 3/04 |

FOREIGN PATENT DOCUMENTS

| | | |
|---|---|---|
| JP | 3021887 U | 3/1996 |
| JP | H10-025635 A | 1/1998 |
| JP | 2000-131162 A | 5/2000 |
| JP | 2003-027352 A | 1/2003 |
| JP | 2006-515071 A | 5/2006 |
| JP | 2006-234716 A | 9/2006 |
| JP | 2009-516839 A | 4/2009 |
| JP | 2009-301880 A | 12/2009 |
| JP | 2010-014694 A | 1/2010 |
| JP | 2010-101836 A | 5/2010 |
| JP | 2010-247810 A | 11/2010 |
| JP | 2011-086114 A | 4/2011 |
| JP | 2012-158848 A | 8/2012 |
| JP | 2012-519846 A | 8/2012 |
| JP | 2013-231246 A | 11/2013 |
| JP | 5754946 B2 | 7/2015 |
| JP | 2016-090319 A | 5/2016 |
| JP | 2016-123549 A | 7/2016 |
| JP | 2016-173685 A | 9/2016 |
| JP | 6025854 B2 | 11/2016 |
| JP | 6107069 B2 | 4/2017 |
| JP | 2017-120237 A | 7/2017 |
| JP | 2017-201487 A | 11/2017 |
| JP | 2018-087726 A | 6/2018 |
| JP | 2019-219395 A | 12/2019 |
| JP | 2020-016554 A | 1/2020 |
| JP | 2020-036027 A | 3/2020 |
| JP | 6689943 B1 | 4/2020 |
| JP | 2020-090768 A | 6/2020 |
| JP | 2020-517841 A | 6/2020 |
| JP | 2020-105651 A | 7/2020 |
| KR | 10-2016-0118110 A | 10/2016 |
| KR | 10-2126137 B1 | 6/2020 |
| KR | 10-2020-0077708 A | 7/2020 |
| KR | 10-2185565 B1 | 12/2020 |
| WO | 2004/064108 A2 | 7/2004 |
| WO | 2007/059971 A2 | 5/2007 |
| WO | 2010/101633 A2 | 9/2010 |
| WO | 2017/002274 A1 | 1/2017 |

OTHER PUBLICATIONS

International Search Report issued in corresponding International Patent Application No. PCT/JP2021/048008 dated Mar. 8, 2022.
International Preliminary Report on Patentability and Written Opinion issued in corresponding International Patent Application No. PCT/JP2021/048008 dated Jul. 6, 2023.

* cited by examiner

Load

Two covered yarns

~1-5 V

GND

Source meter
(SMU)

Output monitor program

PC

Relationship between load application and current value

Relationship between applied load and current value change rate $I_0$ : Initial current value (baseline)

$\Delta I$ : Change in current value

Impedance measuring circuit

SENSING FIBER MEMBER

FIELD

The present invention relates to a sensing fiber member having covered yarns which are covered by wrapping a fiber as a covering material in one direction around a linear conductor as a core material.

BACKGROUND

Smart textiles have been proposed in the prior art, having electrical functional elements formed on flexible or stretchable fiber base materials. Such textiles comprise functional elements such as a sensor, battery, heater and Peltier element provided on a flexible fiber base material, thus allowing realization of highly thin and flexible products which are considered extremely important for the future IoT (Internet of Things) society.

One type of such a sensor that has been proposed is a piezoelectric processed yarn or piezoelectric sensor such as shown in FIG. 1, being a filament member having a contact-sensing function. As described in PTLs 1 to 5, piezoelectric processed yarn (also referred to as piezoelectric threads or piezoelectric filaments) generally has a structure with conductive fibers wrapped by a piezoelectric material such as polylactic acid or polyvinylidene fluoride, and further wrapped with a covering of a conductor such as metal plating. Polylactic acid, a crystalline helical chiral polymer, exhibits a piezoelectric property when provided as a uniaxially stretched film. A piezoelectric property is the property whereby an electrical charge is generated upon application of stress. Thus, between the conductive fibers (1) on the inner layer side and the conductive fibers (3) on the outer side, for example, a "−" charge is generated on side (1) and a "+" charge is generated on side (3), as shown in FIG. 1. The opposite situation may also occur. It is therefore necessary to orient the piezoelectric material, which makes it difficult to increase productivity during the plating step, and therefore at the current time such materials are very costly at about 1000 to 5000 yen per 1 m of processed yarn. Moreover, with the structure shown in FIG. 1 it is currently difficult to produce processed yarn at lengths of 10,000 m or longer, thus also making it difficult to use piezoelectric threads as warp yarn for woven fabrics or warp knitting. The rigidity of polylactic acid as a piezoelectric material is also problematic since it causes the piezoelectric thread to have a poor feel and to lack flexibility for use as fiber.

Also known, as described in PTLs 6 and 7, are contact sensing fiber members that detect contact or load by detecting changes in electrostatic capacitance upon contact or load application between two adjacent electrodes, while techniques are also known for detecting changes in electrostatic capacitance produced when a conductor (such as the human body) approaches a single electrode. However the prior art mainly employs urethane or silicone insulators as insulators between electrode pairs, which makes it difficult to cause large variation in the distances between electrodes, thus lowering output (sensitivity), increasing cost, and resulting in an unsatisfactory feel. When a single electrode is used as described in PTL 8, the changes in electrostatic capacitance are extremely minute and can only be detected by highly advanced signal processing units, such that at the current time their contact sensitivity is low and their sensitivity as proximity sensors is also low.

Techniques relating to covering yarn with excellent bulkiness and highly productive and high-quality covering yarn are also known, as described in PTLs 9 and 10, but these publications do not teach or suggest the use of the covering yarn techniques for sensing fiber members.

CITATION LIST

Patent Literature

[PTL 1] Japanese Patent Publication No. 6025854
[PTL 2] Japanese Patent Publication No. 6689943
[PTL 3] Japanese Unexamined Patent Publication No. 2020-090768
[PTL 4] Japanese Unexamined Patent Publication No. 2020-036027
[PTL 5] Japanese Patent Publication No. 6107069
[PTL 6] Japanese Patent Publication No. 5754946
[PTL 7] Japanese Unexamined Patent Publication No. 2006-234716
[PTL 8] Japanese Unexamined Patent Publication No. 2016-173685
[PTL 9] Japanese Unexamined Patent Publication HEI No. 10-25635
[PTL 10] Japanese Unexamined Patent Publication No. 2013-231246

SUMMARY

Technical Problem

In light of the current level of technology, the problem to be solved by the invention is to provide a sensing fiber member that can be processed to long lengths, that has excellent mass productivity, that can be used as warp yarn for woven fabrics or warp knitting and exhibits an excellent pliable feel, and that can also be provided at significantly lower cost than contact sensing fiber members (piezoelectric threads) that use conventional piezoelectric materials.

Solution to Problem

As a result of diligent experimentation with the aim of solving this problem, the present inventors have found, unexpectedly, that the problem can be solved by the construction described below, and the invention has been completed upon this finding.

Specifically, the present invention is as follows.

[1] A sensing fiber member having at least two covered yarns are covered by wrapping a low electrical conductivity (or insulating) fiber as a covering material around a linear conductor as a core material, among which two are adjacently disposed, wherein change in resistance and/or change in electrostatic capacitance between the linear conductors of the two mutually adjacently disposed covered yarns is read off.

[2] The sensing fiber member according to [1] above, wherein the low electrical conductivity fibers include either multifilament fibers or spun yarns.

[3] The sensing fiber member according to [1] or [2] above, wherein the sensing fiber member detects contact or load of an object on the sensing fiber member.

[4] The sensing fiber member according to [1] or [2] above, wherein the sensing fiber member detects stretching or bending deformation of the sensing fiber member.

[5] The sensing fiber member according to [1] or [2] above, wherein the sensing fiber member detects changes in contact or humidity of a liquid on the sensing fiber member.

[6] The sensing fiber member according to any one of [1] to [5] above, wherein the twist coefficient K of the covered yarn, represented by the following formula:

Twist coefficient $K=(SS+SC)^{1/2} \times R$

{where SS is the fineness (dtex) of the linear conductor as a core material, SC is the total fineness (dtex) of the covering material, and R is the wrapping number (number of twists) (per meter) of the covering material}, is 7000 to 30,000.

[7] The sensing fiber member according to any one of [1] to [6] above, wherein the covering material is double covering yarn in which the circumference of the linear conductor as a core material is covered by two covering yarns, and the wrapping directions of the two covering yarns are the same direction.

[8] The sensing fiber member according to any one of [1] to [7] above, wherein the two mutually adjacently disposed covering yarns have crossing contact points.

[9] The sensing fiber member according to any one of [1] to [8] above, wherein the linear conductor as a core material is a multifilament conductive fiber.

[10] The sensing fiber member according to any one of [1] to [9] above, which is a woven fabric with arrangement of at least two of the covered yarns.

[11] The sensing fiber member according to any one of [1] to [9] above, which is a knitted fabric with arrangement of at least two of the covered yarns.

[12] The sensing fiber member according to any one of [1] to [9] above, wherein the wrapping direction of the low electrical conductivity fibers of the two mutually adjacently disposed covered yarns is the same, and the two covered yarns are plied yarns which are plied in the opposite direction from the wrapping direction of the low electrical conductivity fibers.

[13] A woven fabric in which the sensing fiber member according to above, as plied yarn, is interwoven.

[14] A knitted fabric in which the sensing fiber member according to above, as plied yarn, is knitted.

[15] A sensing fiber member for detection of proximity or contact of an object, having at least one covered yarn that is covered by wrapping a low electrical conductivity fiber as a covering material around a linear conductor as a core material, wherein proximity or contact of an object to the sensing fiber member is detected by change in electrostatic capacitance between the linear conductor of at least one covered yarn and the ground due to proximity or contact of the object.

Advantageous Effects of Invention

The contact sensing fiber member of the invention can be processed to long lengths, has excellent mass productivity, can be used as warp yarn for woven fabrics or warp knitting and exhibits an excellent pliable feel, while it can also be provided at significantly lower cost than contact sensing fiber members (piezoelectric threads) that use conventional piezoelectric materials. Specifically, because the contact sensing fiber member of the invention allows sensing of a load using the common fiber materials polyester or nylon, it is possible to obtain contact sensing fibers at very low cost, and since it employs established covering technology for processing of the fibers, it is possible to achieve processing to long lengths and to obtain excellent mass productivity, while also obtaining processed yarn with a highly superior feel compared to piezoelectric yarn, thereby facilitating formation into fiber members such as woven or knitted fabrics.

The contact sensing fiber member of the invention is able to detect the state of continuous application of a load, due to changes not only in the electrostatic capacitance but also in the resistance value.

The contact sensing fiber member of the invention can therefore be used for a wide range of purposes, including for smart textiles provided with electrical functional elements on flexible or stretchable fiber base materials, contact sensing woven or knitted fabrics such as rugs that can detect when they are stepped on, anti-theft mats for detecting human entrance or exit, or human counting mats, monitoring sensors at facilities such as nursing or caregiving centers, sensors that digitalize and transmit tactile sensations at production sites such as factories, sensor-embedded members in vehicle seat belts, embedded contact sensors (bio-sensors) that are embedded into vehicle seat belts, handles or dashboards, detection sensors for detecting the presence or absence of humans, child neglect preventers on back seats, or monitoring sensors.

DESCRIPTION OF EMBODIMENTS

Figure 1:
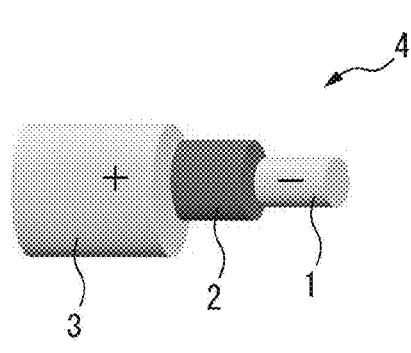
FIG. 1 is a schematic diagram of a conventional piezo-electric processed yarn.

An embodiment of the invention will now be described in detail.

One embodiment of the invention is a sensing fiber member having at least two covered yarns which are covered by wrapping a low electrical conductivity (or insulating) fiber as a covering material in one direction around a linear conductor as a core material, among which two are adjacently disposed, wherein change in resistance and/or change in electrostatic capacitance (i.e. change in impedance) between the linear conductors of the two mutually adjacently disposed covered yarns is read off.

The linear conductor as the core material (core thread) is not particularly restricted so long as it is electroconductive, and it may be a linear conductor in which the material itself is conductive, for example, conductive fibers such as carbon fibers or metal fibers, or it may be a linear conductor in which non-conductive fibers have been imparted with electroconductivity. In the former case, carbon fibers prepared as fiberized carbon are preferred for high durability in moisture sensing, as described below. A fiberized SUS material is preferred as it can ensure rust resistance and simplify end processing including connection with circuits. In the latter case, using a metal plating such as silver or copper around a filament of nylon or the like, or a metal foil wrapped around a tape-like filament, or an aerosol-like electric conductor adhered onto a fiber surface by spraying, is preferred from the viewpoint of improving the feel and flexibility. In this case, the conductive fibers are preferably composed of multifilaments to obtain satisfactory conductivity and increased strength. Using high-strength fibers such as poly-allylate or aramid instead of nylon can further increase the tensile strength. Alternatively, the linear conductor used may be one imparted with conductivity by using stretchable metal ink around an elastic solid such as urethane or silicone. This will allow a stretchable fiber member to be obtained. The linear conductor used may also be a linearized mixture of a conductive material and a low electrical conductivity (or insulating) material. For example, using a material obtained by linear processing of a material mixture of a carbon-based conductive material or a metal mixed with a resin such as nylon or polyester can yield a significantly lower-cost linear conductor, though with some reduction in conductivity. A linear conductor may also be one or more metal wires, from the viewpoint of lower cost even while exhibiting a poorer feel. For example, the strength can be drastically increased by using metal wire with a diameter of about 30 μm to 1 mm.

The linear conductor has a conductive fiber fineness of preferably 10 dtex to 15,000 dtex and more preferably 20 dtex to 5000 dtex, from the viewpoint of tending to provide a more satisfactory feel. In the case of a multifilament, the single fiber fineness is preferably 1 dtex to 30 dtex and more preferably 2 dtex to 10 dtex, from the viewpoint of tending to provide a satisfactory feel and high conductivity. The number of filaments is more preferably 10 to 200. The number of filaments is preferably 10 or more from the viewpoint of more easily obtaining a satisfactory feel and ensuring satisfactory conductivity. An excessively large number of filaments, however, may increase cost and may also further increase the rigidity, thus impairing the feel. For these reasons the aforementioned range is preferred for the number of filaments.

The conductive material forming the linear conductor may be the same material for both covered yarns of a pair, or they may be of different materials, using any desired combination of materials. For sensing of contact, load or tension, it is preferred to use the same conductive material to allow more efficient production. For sensing of liquids such as moisture, using different materials for the linear conductors in pairs of two covered yarns causes generation of voltage or current by an electrochemical effect known as galvanic action when the liquid forms an adhering bridge between the two different materials, thus allowing sensing of liquids without a power source. Examples of combinations of different materials include combinations of iron and copper, iron and silver, aluminum and copper, and silver and copper.

As used herein, the term "low electrical conductivity (or insulating) fiber", for the covering material (or "covering yarn"), encompasses piezoelectric elements such as poly-lactic acid (PLA) and ferroelectric substances such as poly-vinylidene fluoride (PVDF), without any particular restrictions so long as the two linear conductors as core materials can be electrically insulated. However, in order for the covering yarn to be able to cover the linear conductor as the core material while stationary without forming a gap, and preventing electrical shorting, it preferably includes either multifilament insulating fibers or insulating spun yarn that can produce evenness and a homogeneous covering thickness, from the viewpoint of the coverage, sensing performance and feel, and most preferably it consists of multifilament insulating fibers or insulating spun yarn. The material of the low electrical conductivity fiber is not particularly restricted so long as insulation is ensured when in a state without sensing action such as contact, tension or liquid contact (an idling state), but from the viewpoint of cost and availability, polyester (PE), nylon (Ny, polyamide), epoxy or acrylic synthetic fibers are preferred, while natural fibers such as cellulose fiber, semisynthetic fibers or regenerated fibers may also be used. Insulating fiber materials to be used include piezoelectric elements or ferroelectric substances, such as polylactic acid (PLA) or polyvinylidene fluoride (PVDF), and biodegradable resins. A piezoelectric element can ensure insulation in an idling state and produce an output signal corresponding to the piezoelectric characteristic during application of stress, thus increasing the sensor sensitivity. From the viewpoint of cost and the feel of formed woven or knitted fabrics, however, it is preferred to use fibers commonly used in clothing, such as polyester, nylon or acrylic fibers.

For sensing of changes in resistance, a material that imparts slight conductivity to the insulating fibers may be used as the covering yarn (sheath thread). The range of conductivity for the sheath thread may be a range in which change in resistance between linear conductors of two mutually adjacently disposed covered yarns can be read off. Specifically, the value of the resistance (sensor resistance) between linear conductors of mutually adjacently disposed covered yarns is preferably in the range of 0.5 kΩ to 5 GΩ, and the sensor resistance value is preferably 20 times to $1\times10^9$ times the value of the resistance of the linear conductors alone (wiring resistance). This will sufficiently increase the sensor resistance value with respect to the wiring resistance value without causing electrical shorting, when voltage is applied between two linear conductors forming two mutually adjacent covered yarns, thus allowing load and tensile force to be accurately detected without being affected by the wiring resistance. The sensor resistance value is more preferably in the range of 0.5 kΩ to 100 MΩ from the viewpoint of simplicity of the reading circuit. The range for the electric resistivity of the sheath thread material is preferably $10^4$ Ω·m to $5\times10^9$ Ω·m from the viewpoint of easily satisfying the aforementioned sensor resistance range.

The material of the sheath thread that has imparted slight conductivity may be a material comprising a conductivity-imparting material, such as a carbon-based conductive material, metallic particles, a metal sulfide such as copper sulfide or a metal oxide such as tin oxide or zinc oxide, added to a polyester, nylon or acrylic insulating materials. Alternatively, the sheath thread used may be a mixture of both insulating fibers and conductive fibers. For example, CRA-CARBO (trademark of Kuraray Co., Ltd.), BELTRON (trademark of KB Seiren, Ltd.) or THUNDERON (trademark of Nihon Sanmo Dyeing Co., Ltd.), marketed as antistatic fibers, may be selected to provide the desired sensor resistance.

The sensing fiber member of the embodiment preferably uses a combination of more quick-drying fibers as the material for the covering material (covering yarn). For sensing of moisture or ethanol, in particular, using quick-drying fibers for the covering yarn allows drying in a short period after contact with moisture and the like, allowing the original state to be restored more quickly. Quick-drying fibers may be synthetic fibers with a low moisture content, but in order to exhibit both water absorption and quick-drying performance they are most preferably a combination of synthetic fibers and cellulose fibers. Synthetic fibers in this case are preferably polyester, nylon or acrylic fibers, cellulose fibers are preferably natural cellulose fibers such as cotton or hemp, regenerated cellulose fibers such as rayon, polynosic, lyocell, cupra or modal fibers, or semisynthetic fibers such as acetate, with multifilament long fibers being especially preferred. A combination of both fibers may be a blend of both fibers for a covering yarn, or in the case of double covering, it may be covering with synthetic fibers and cellulose fibers.

The fineness of the insulating fibers is preferably 15 dtex to 25,000 dtex and more preferably 30 dtex to 8000 dtex, from the viewpoint of helping to ensure a low electrical conductivity property. In the case of a multifilament, the single fiber fineness is preferably 1 dtex to 10 dtex and more preferably 2 dtex to 8 dtex, from the viewpoint of more easily obtaining a satisfactory feel.

The method for producing covering yarns is not particularly restricted, and the following method described in PTL 9 may be used, for example.

Figures 10, 11:
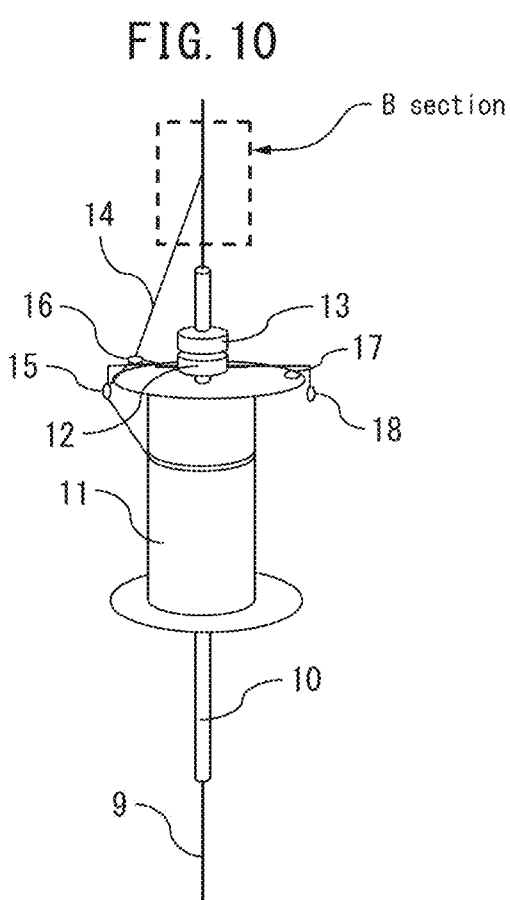
FIG. 10 is a schematic diagram of a production apparatus for covering yarn.
FIG. 11 is a schematic diagram of covering yarn obtained by the aforementioned production apparatus.

FIG. 10 is a schematic diagram where bobbin wound with a covering yarn (14) is loaded in while operating a covering device equipped with a double-drive flyer (12). FIG. 11 shows a magnified view of section B in FIG. 10. The core thread 9 passes through the hollow section of a hollow spindle 10, and then through a snail guide above it (not shown), finally being taken up onto a take-up roll (not shown). The covering yarn 14 is passed through one drive guide 15 and 16 of the double-drive flyer 12 and reeled from the bobbin by rotation of the hollow spindle (in tandem with the bobbin), and the covering yarn 14 is passed through the snail guide while being wound around the core thread 9, and is taken up. The reason for having two drives of the flyer 12 is in order to provide balance to the flyer 12 when the flyer rotates.

Double covering may also be carried out, whereby covering devices are arranged vertically in two levels and two different covering yarns (either of the same type or different types) from two bobbins are used for covering in order. Most preferably, each covering yarn is used for covering in the same direction (the two covering yarns being both S-twisted or Z-twisted), so that the thickness can be made uniform and the gaps between the low electrical conductivity fibers can be reliably filled, allowing the sensing performance to be improved.

The covering yarn may also be a false twisted finished yarn (woolly yarn), from the viewpoint of more easily improving the feel and coverage.

Figure 2:
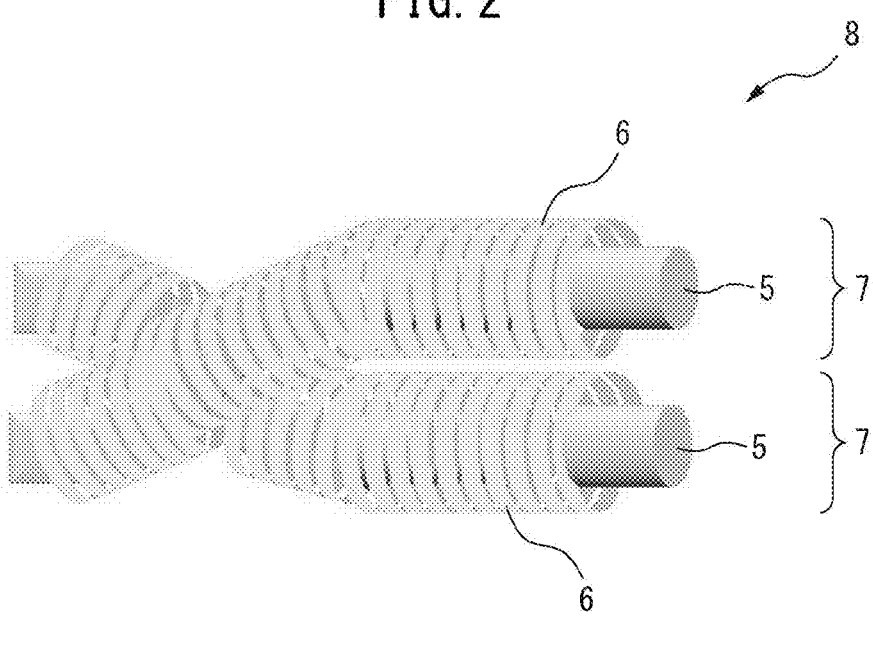
FIG. 2 is a schematic diagram of a sensing fiber member of an embodiment of the invention.
Figure 2:
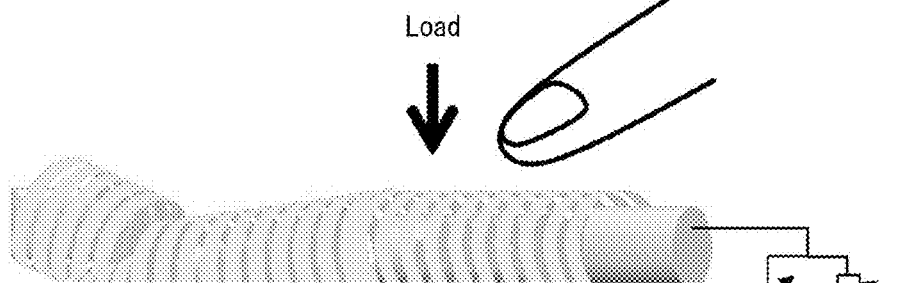
Figure 2:
Figure 3:
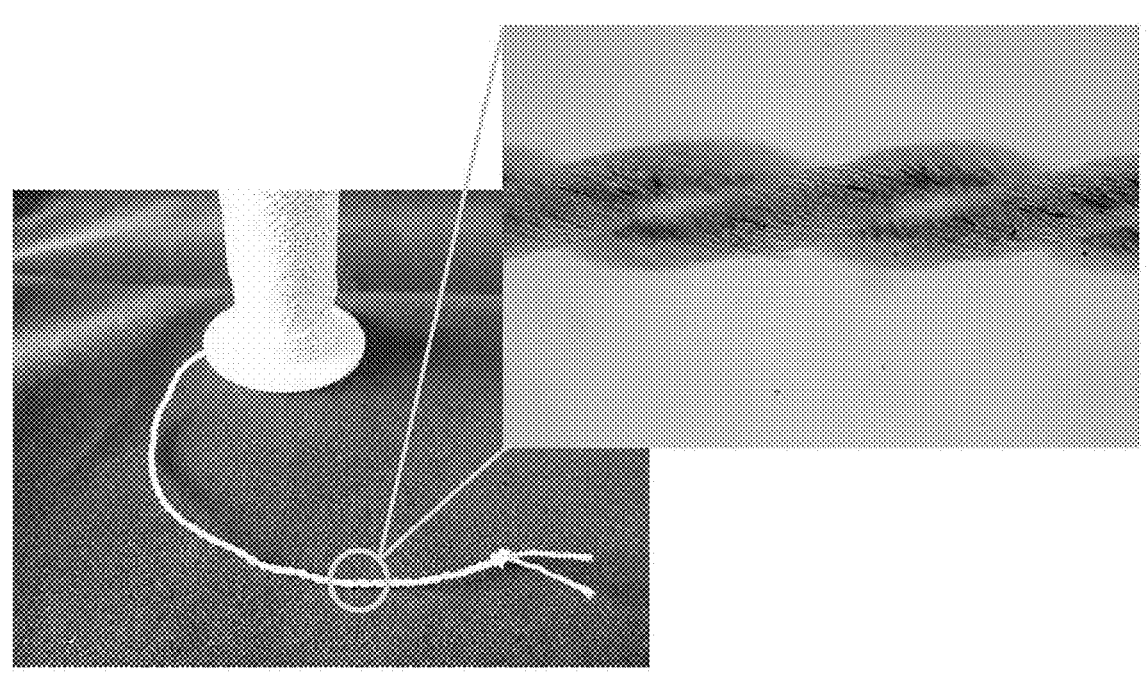
FIG. 3 shows the outer appearance of the sensing fiber member of the embodiment, as a plied yarn, and a magnified photograph of the same.

FIG. 2 and FIG. 3 show examples of plied yarns formed from two covered yarns (7), as sensing fiber members of the embodiment. Preferably, the wrapping directions are the same for the covering materials (covering yarns) (6) disposed around the linear conductor as the core material (5) for the two mutually adjacently disposed covered yarns (7), and the two covering yarns are plied yarns (8) plied in the direction opposite from the wrapping direction of the multifilament covering fibers. Plying (twisting in the direction opposite from the wrapping direction of the covering yarn) weakens the torque of the final yarn and facilitates handling during the production steps. Plied yarn has the two covered yarns situated mutually adjacent, with the two covered yarns having crossing contact points.

The twist coefficient K of the covered yarn, represented by the following formula:

$$\text{Twist coefficient } K=(SS+SC)^{1/2}\times R$$

{where SS is the fineness (dtex) of the linear conductor as a core material, SC is the total fineness (dtex) of the covering material, and R is the wrapping number (number of twists) (per meter) of the covering material}, is preferably 7000 to 30,000. A twist coefficient K of 7000 or greater will tend to prevent electrical short circuiting between the two linear conductors, and 30,000 or lower will help to produce greater sensor output. In the case of double covering, the twist coefficient is calculated during covering of the first and second layers, and the average value is used.

Figure 4:
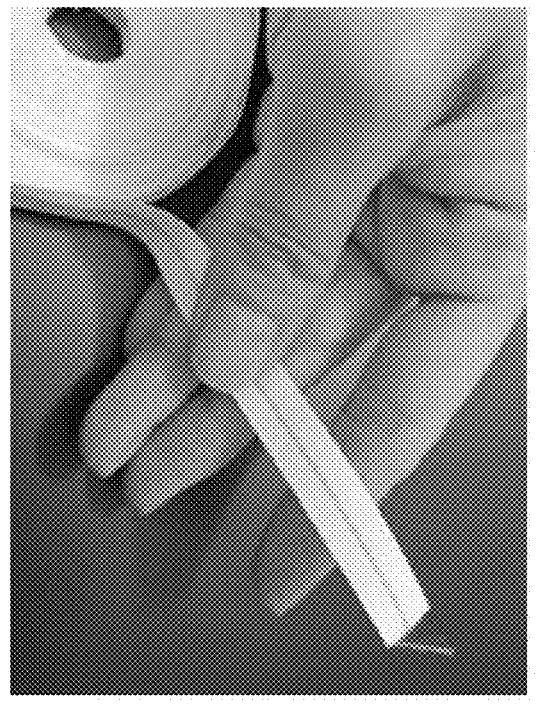
FIG. 4 is a photograph of a narrow woven fabric with interweaving of a sensing fiber member of the embodiment, as plied yarn.

The sensing fiber member of the embodiment may be in the form of a narrow woven fabric with the plied yarn running continuously in one direction of the woven fabric, as shown in the example in FIG. 4. In FIG. 4 the plied yarn is woven as warp yarn at the widthwise center section of the narrow woven fabric, but the plied yarn may be used as either or both the warp yarn and weft yarn, in any number depending on the number of locations where sensing is desired. From the viewpoint of continuous production, it is preferred for the plied yarn to be used as part of the warp yarn. This will allow detection of contact or load from objects at the sections where the plied yarn has been interwoven, and/or sensing of changes in liquid contact or changes in humidity. When the plied yarn has been interwoven into part of a narrow woven fabric, the shape of the fiber member adopts a tape-like form, which is advantageous for fiber products such as clothing or bags as compared to using the plied yarn alone. The width of the woven fabric containing the plied yarn is preferably 1 to 200 mm and more preferably 5 to 30 mm. The use of fibers other than the plied yarn is not particularly restricted, and the woven texture is also not particularly restricted. In order to help prevent static electricity in a fabric with a fiber sensing member of the embodiment, the plied yarn may be wrapped with antistatic thread interwoven with a conductive material, with the yarn being embedded in the woven fabric. The antistatic thread used may have an electrical resistance value of $10^6$ to $10^{10}$ Ω/cm per unit length, and for example, it may be "BELLTRON$^R$" carbon, Belltron type or white Belltron type by KB Seiren, Ltd., or "CRACARBO$^R$" by Kuraray Co., Ltd. In a fabric having a fiber sensing member of the embodiment, a similar effect can also be obtained by arranging antistatic thread near the member or between multiple disposed members.

Figure 5:
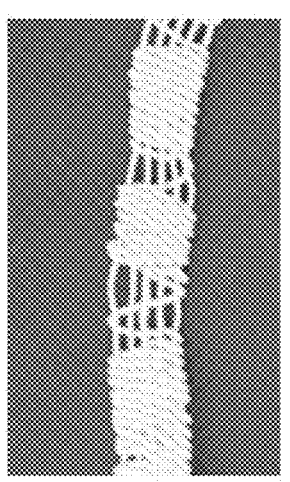
FIG. 5 is a photograph of a sensing member of the embodiment, in the form of a plain weave woven fabric where the warp yarn and weft yarn are covered yarn which is covered by wrapping an low electrical conductivity fiber as a covering material around a linear conductor as a core material.

A woven fabric having multiple plied yarns for warp and weft may also be used (see FIG. 5). In FIG. 5, five rows of warp yarn are arranged with weft yarn woven at left and right, but the braided woven fabric form is not limited to such a structure. For example, a sensing fiber member may be formed having the aforementioned plied yarn interwoven at a pitch of 5 to 10 cm for both warp yarn and weft yarn, in a woven fabric with a width of about 150 cm to 200 cm and a length of about 50 m. Using such a sensing fiber member with multiple interwoven plied yarns allows simultaneous measurement of loads at the locations of each of the plied yarns, so that the locations of applied loads can be mapped. Such a sensing fiber member can be used in a bed pad or sheet or a pillowcase, for example, to allow measurement of the presence or movement of the human body.

Alternatively, the covered yarn may be used as both warp yarn and weft yarn in a woven fabric. In this case, two covered yarns are disposed adjacently at intersections between warp and weft thread, to exhibit the aforementioned sensing function at those sections for application as a sensing fiber member. The form of the woven fabric may be any form, including the one illustrated in FIG. 5.

The plied yarn can also be arranged in a knitted fabric. Alternatively, two or more covered yarns may be arranged in a partially adjacent or crossing manner to exhibit a sensing function.

Such covered yarn may also be used as top thread or bottom thread in a sewing machine during fabric sewing or embroidery. This will provide one covered yarn each above and below the fabric, to exhibit the aforementioned sensing function at the contacting points of the covered yarn for application as a sensing fiber member.

When producing a fabric such as a woven fabric or knitted fabric, the linear conductor in each pair of two covered yarns more preferably has one of the electrode leads (parts for mounting onto a circuit) leading out on the front side of the fabric, and the other on the back side of the fabric. Most preferably, all of the linear conductors used for voltage application lead out on the same side of the fabric, with the signal output conductors leading out on the opposite side.

This preferred example is advantageous in that when electrically connecting a plurality of linear conductors to apply voltage or reading out each of the signals independently, it is possible to prevent electrical short circuiting with less space, and also in that mounting is simplified, thus improving productivity.

Figure 6:
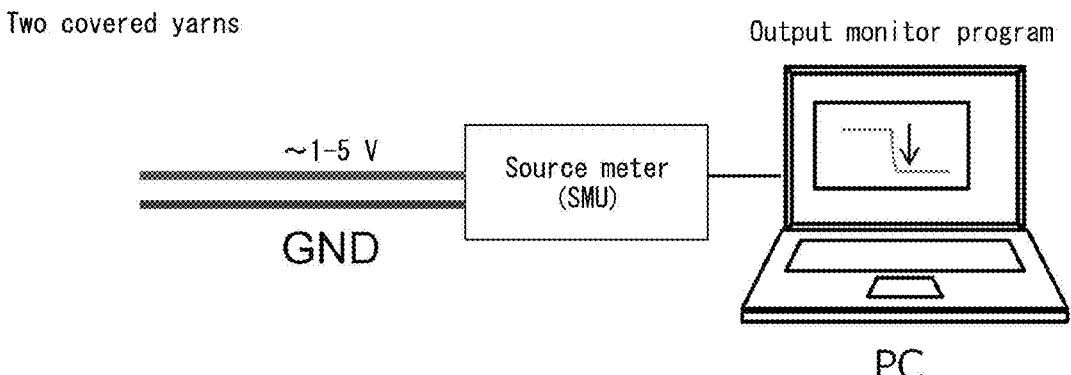
FIG. 6 is a schematic diagram showing a device system for measurement of change in resistance between two covered yarns covered by wrapping a low electrical conductivity fiber as a covering material around a linear conductor as a core material.

FIG. 6 is a schematic diagram showing a device system for measurement of change in resistance between two covered yarns covered by wrapping a multifilament low electrical conductivity fiber as a covering material around a linear conductor as a core material. The conductive fibers are open at the ends of the pair of two covered yarns, and a source meter (SMU: source major unit) is connected allowing simultaneous measurement of voltage, current and resistance upon supply of voltage and current, allowing measurement of the resistance between the pair of covered yarns. Instead of using this type of measuring instrument, a readout circuit may be formed using an analog/digital conversion circuit, current-voltage conversion circuit or amplification circuit, for use in measuring the resistance.

Without intending to be constrained by any specific theory, it is possible that the insulating fiber between the pair of covering yarns, which is a highly insulating substance in the idling state, obeys the space charge limited current represented by the following Mott-Gurney formula:

$$I = \frac{9}{8}\varepsilon\mu\frac{V^2}{L^3} \qquad \text{[Formula 1]}$$

{where I is current, ε is the permittivity of the insulator, μ is the carrier mobility, V is the voltage and L is the distance between linear conductors}, considering carrier injection when the distance between the two linear conductors is extremely small. In this case, the current I increases inversely with the cube of the distance L. Deformation of the covering material due to contact or load can be converted to change in current I which can be precisely detected as change in resistance. In the example of the embodiment, for example, when using an insulator on a sensing section area of 8.75 mm$^2$, application of an approximately 3 N load (corresponding to a pressure of 3.43×10$^5$ Pa) produces conversion to R of between 3.5 GΩ and 1.5 GΩ, with a very large change for ΔR/R of −57%.

A possible sensing principle is that application of a load or tension causes deformation of covering materials and closer contact between them, increasing the number of contacts and thus allowing more current to flow to the sheath threads. This principle can be described as follows. For covering materials of the invention, absolutely no current flows between the two linear conductors if the covering material is an ideal insulator, but an actual practical insulator is slightly conductive with an electric resistivity known to be $10^6$ to $10^9$ Ω·m. The mechanism of electrical conduction in an insulating polymer is known to be hopping conduction, whereby electrons and ions traverse through local states. Although ideally no charged particles are present in an insulating polymer, actual polymer materials contain impurities such as catalysts and moisture introduced during the manufacturing process, and the dissociated ions resulting from such impurities react to the applied electric field and move, generating a weak current. When a sheath thread with only very little conductivity is placed between two adjacent linear conductors and a load or tensile force is applied to the structure, the fibers composing the sheath thread come into closer contact with each other, increasing their electrical contact points and causing the value of the weak current to increase. According to this principle, therefore, the sensor resistance decreases, allowing detection of load or tensile force.

Figure 12:
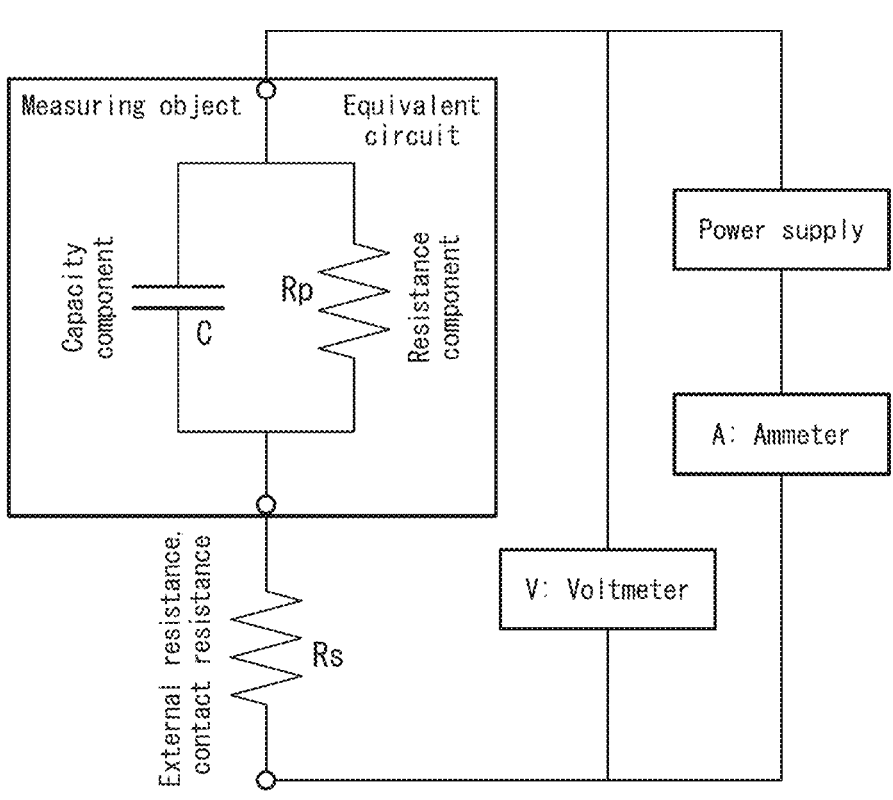
FIG. 12 is an illustration of the principle of measurement of the electrical characteristic between a pair of covering yarns.

The principle of measurement of electrical characteristics between pairs of covered yarn can be considered for an equivalent circuit consisting of a resistor (R) and condenser (C), as shown in FIG. 2 and FIG. 12.

When a sensing signal is to be read off from a change in resistance value, a DC power supply can be used as the electric power supply represented in FIG. 12.

When a change in electrostatic capacitance is to be read off, an AC power supply may be used, applying alternating current with a frequency f between linear conductors in the pair of covered yarns and detecting change in impedance. For measurement of capacitance, a common measuring instrument or circuit can be used, such as an LCR meter or an impedance analyzer. Alternatively, a lock-in amplifier circuit can be used in combination, whereby an AC signal is used as a reference signal and the output signal and reference signal are multiplied for frequency analysis. This provides an advantage in that even small changes in electrostatic capacitance can be measured with greater precision. For reading of changes in electrostatic capacitance, on the other hand, a DC power supply as the power source to apply voltage between two linear conductors, reading off the time-dependent change in impedance between them (by monitoring changes in current). Using a DC power supply is advantageous in that it allows measurement to be made using a very inexpensive circuit. The electrostatic capacitance between two electrodes in this case can be described by the following formula:

$$C = \varepsilon(S/L)$$

{where $\varepsilon$ is the dielectric constant between the two electrodes, S is the electrode area, and L is the distance between the electrodes}.

Based on the formula $C=\varepsilon(S/L)$, the electrostatic capacitance C is inversely proportional to the distance L between the conductors and proportional to the electrode area. When the object to be detected by contact or the like is an insulator without charge, the distance between the pair of linear conductors decreases and the electrode area undergoes essentially no change, resulting in an increase in electrostatic capacitance, thus allowing detection of contact with the object. When the contacting object is conductive, parasitic capacitance caused by contact with the object is further added, producing a further change in electrostatic capacitance. In the example of the embodiment described above (where $\Delta R/R$ is −57%), C changes from 3.31 pF to 3.53 pF under an applied load of about 3 N using an insulator, resulting in $\Delta C/C$ of 6.7%. When a load of about 3 N is applied using a grounded conductive material, C changes from 3.31 pF to 3.01 pF, for a $\Delta C/C$ of −8.9%.

When the contacting object is conductive, cumulative parasitic capacitance and increased leakage of charge to ground causes the apparent electrostatic capacitance to decrease. It is thus possible to detect contact or load by reading changes in static capacitance caused by the contact or load. In this example, the change in resistance value is larger than the change in electrostatic capacitance in FIG. 12. but this is because the change in electrostatic capacitance is inversely proportional to L, as according to the formula shown above, whereas the change in current value flowing between the electrodes is inversely proportional to $L^3$, for example, so that the change in current value is further increased with smaller inter-electrode distance L. The covering yarn and external air (the external air being normal air when in the atmosphere, or a vacuum when in a vacuum, or replacement gas, when in replacement gas) act as insulating materials between two linear conductors for this embodiment, with the principle of current flowing between them differing depending on the conditions such as the distance and applied voltage between the electrodes, and the humidity of the external air. Other principles such as leakage current and ionic conduction may also be applied, and either or both changes in resistance value and/or changes in electrostatic capacitance can be read off as output signals.

The sensing fiber member of the embodiment can detect changes in impedance between two linear conductors caused by external activity, thus detecting the external activity. For example, a change in distance between the two linear conductors caused by application of contact or load will result in a change in the resistance value and/or electrostatic capacitance (impedance) between the two linear conductors, thus allowing detection of the contact or load. In cases where the external activity is tensile force or bending stress as well, changes in the distance between linear conductors produce changes in impedance, allowing the external activity to be detected. Alternatively, when a substance that can change the impedance between two linear conductors is added, the presence or absence of that substance can be detected. For example, when non-ultrapure water such as tap water, or brine, an ion beverage or a water/ethanol mixture is dropped between two linear conductors, the resistance value between the linear conductors decreases significantly, increasing the current value between them and thus allowing detection of the presence or absence of the liquid. Changes in humidity likewise cause changes in impedance, allowing use as a humidity sensor.

Alternatively, application of contact or load and contact with a liquid such as moisture may be detected simultaneously. Since the amounts of change in the resistance value upon load application or moisture inserting differ by 5 times or more as explained below, and the output changes moment by moment as moisture dries, it is possible to distinguish between the different detections based on the behavior of the output values. For example, using a bed sheet pad constructed with a woven fabric with a plurality of the aforementioned plied yarns interwoven for this embodiment allows simultaneous detection of movement, wetness or urine leakage by a bed user such as a care recipient.

The examples of sensing according to the embodiment described in the following Examples are for sensing contact or load on a sensing fiber member by an object, and/or sensing of contact on a sensing fiber member by a liquid (tap water or a mixture of ethanol and water).

EXAMPLES

The invention will now be explained in greater detail using Examples and Comparative Examples, with the understanding that the invention is in no way limited by the Examples.

The methods used in the Examples and Comparative Examples for measuring the physical properties were the following.

(1) Measurement of Resistance (Current) Value

The resistance value between two linear conductors of two adjacent covered yarns was measured by electrically opening the two linear conductors at the ends of the covered yarns, and connecting a source meter (SMU: source major unit, Model 2614B by Keithley Co.) which allowed simultaneous measurement of voltage, current and resistance upon supply of voltage and current between the two linear conductors on the other ends. A constant voltage was applied between the two linear conductors, and the current value before and after load application was measured using a proprietary program for constant monitoring of the current value outputted by the source meter. For plied yarn, the sensing property was measured using a sample fabricated so that the length of the paired linear conductor section (the effective length for sensing) was 10 cm.

(2) Load Application

The change in current of the sample (between two plied yarn conductive fibers, for example) under applied load was measured while applying a voltage. The load application was carried out as follows.

A sensing fiber member was placed on a flat stage, and a load was applied over it using a force gauge (Full-Range 20N by Imada Co.), while monitoring the load value. A circular indenter with a diameter of ($\varphi$12.5 mm was used.

The following load ranges may be used for reference:
≤0.5 N: Very slight contact.
2 to 5 N: Light pressing with the finger.
~10 N: Relatively strong pressing with the finger.

(3) Contact and Load Sensing Property

The contact and load sensing property was evaluated on the following scale:

Evaluation Scale

Where I is the current value between two linear conductors in the absence of contact or load, the area of the section of the fiber member subjected to the load is 8.75 mm$^2$ (12.5 mm diameter ×0.7 mm mean fiber size), and $\Delta$I is the difference between I and the current value after application of a 3 N load by the method of (2) above:
VG: $\Delta$I/I of 20%
G: $\Delta$I/I of ≥1% and <20%
P: Undetectable.

(4) Moisture Sensing Property

The sensing property of the plied yarn for moisture was measured by the following procedure.

The same method used to measure the resistance value of (1) is used for application of 10 mV between the pair of plied yarn conductive fibers while monitoring the current value.

Tap water is sprayed onto the sample using an atomizer and the change in current value is monitored.

It is then wiped with kitchen paper and dried with a dryer, and restoration to the original current value is confirmed.

The moisture sensing property was evaluated on the following scale:

Evaluation Scale

VG: $\Delta$I/I of ≥100% and current value restored to within ±20% of original value.
F: $\Delta$I/I of ≥1% and <100%, or current value failed to return to within ±20% of original value.
P: Undetectable.

(5) Feel

The yarns or woven or knitted fabrics obtained in the Examples and Comparative Examples were contacted with the wrist and the touch sensation was assessed as the feel, on the following scale:

Evaluation Scale

VG: Soft with virtually no irritation to the wrist
G: Slight irritation to the wrist (rough surface or stiff feel)
F: Strong rough surface with strong sensation of rubbing on the wrist
P: Stiff with high discomfort, unsuitable for clothing

Example 1

The linear conductor used was conductive fiber composed of a multifilament of nylon 66 fiber with silver plating. The fineness of the nylon fiber was 220 dtex, the fineness after silver plating was 300 dtex, and the linear conductor had 68 filaments.

Double covered yarn was formed using polyester fibers as the sheath threads around the linear conductors as the core threads. As the covering conditions, two bobbins of wooly yarn of 252 dtex/108 filaments polyester were used for the sheath yarn, Z-twisting each with a twisting number Z of 732 T/m. The two obtained double covered yarns were put together and further S-twisted to produce plied yarn with a twisting number S of 170 T/m. The fineness of the plied yarn was 2000 dtex. The twist coefficient K of the plied yarn was calculated to be $(300+252\times2)^{1/2}732=20,756$.

Figure 7:
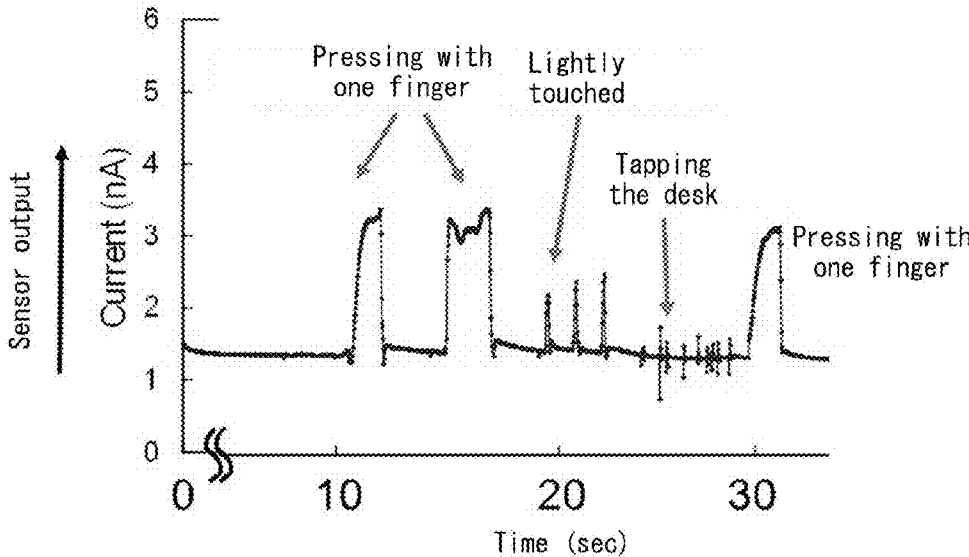
FIG. 7 is a graph showing an example of output current value (sensor output) for a sensing fiber member of the embodiment, as plied yarn of Example 1, when load is applied. Here, the applied load conditions differ from the conditions in Table 1.
Figure 8:
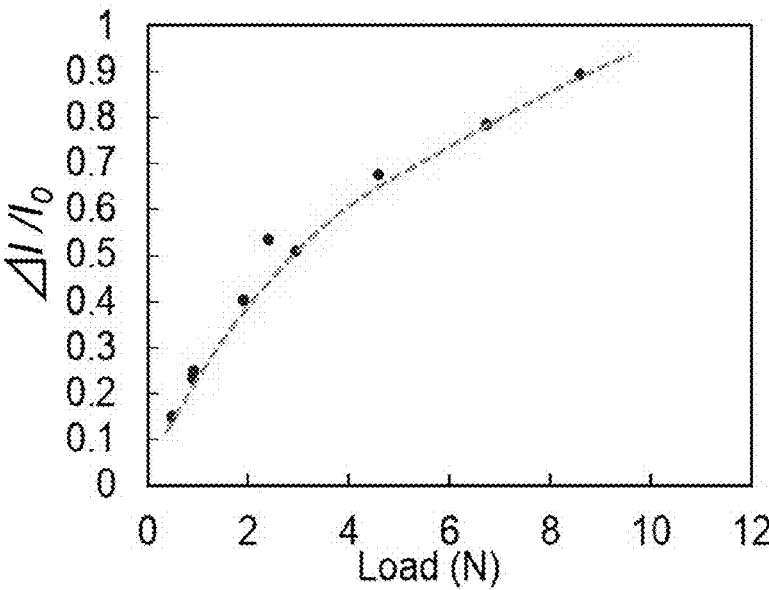
FIG. 8 is a graph showing the relationship between rate of change in applied load and current value (sensor output) for a sensing fiber member of the embodiment, as plied yarn.

FIG. 7 and FIG. 8 show the state of change in the current value (sensor output) upon application of a load to the obtained plied yarn, and the relationship between the rate of the change in the current value and the applied load, respectively. Based on the results shown in the graphs, the plied yarn was judged to be useful as a contact sensing fiber member, and the sensing property using the plied yarn was evaluated upon application of a load. Table 1 shows the results of evaluating the contact/load sensing property, feel and moisture sensing property.

Example 2

Plied yarn was produced in the same manner as Example 1, except that a 280 dtex/48 f polylactic acid multifilament was used as the covering thread. Table 1 shows the results of evaluating the contact/load sensing property, feel and moisture sensing property.

Example 3

Plied yarn was produced in the same manner as Example 1, except that a 276 dtex/96 f nylon multifilament was used as the covering thread. Table 1 shows the results of evaluating the contact/load sensing property, feel and moisture sensing property.

Example 4

Plied yarn was produced in the same manner as Example 1, except that the linear conductor used was a metal wire with a diameter of 260 μm (metal diameter: 76 μm) obtained by covering the surface of a soft copper wire with tin plating, with the circumference further covered with a PTFE (polytetrafluoroethylene) resin. Table 1 shows the results of evaluating the contact/load sensing property, feel and moisture sensing property.

Comparative Example 1

A plied sample was produced using two wires having the surfaces covered with an insulating vinyl resin to a thickness of 2 mm, instead of the covering thread in Example 1. Table 1 shows the results of evaluating the contact/load sensing property, feel and moisture sensing property.

Comparative Example 2

A sample was produced in the same manner as Comparative Example 1, except that the same metal wire as Example 4 was used as the linear conductor, and two metal wires covered with TEFLON™ resin to a thickness of 100 μm were plied. Table 1 shows the results of evaluating the contact/load sensing property, feel and moisture sensing property.

Example 5

One plied yarn obtained in Example 1 as the warp yarn, 334 dtex/96 f wooly polyester for the other warp yarn, 167 dtex/48 f wooly polyester as the weft yarn, and 84 dtex/36 f wooly polyester as the binding yarn, were used to produce a narrow woven fabric with a width of 10 mm, a thickness of 450 μm and a basis weight of 2.14 g/m², with the plied yarn arranged at approximately the center in the widthwise direction. Table 1 shows the results of evaluating the contact/load sensing property, feel and moisture sensing property.

Example 6

A narrow woven fabric was produced in the same manner as Example 5, except for using the plied yarn obtained in Example 2. Table 1 shows the results of evaluating the contact/load sensing property, feel and moisture sensing property.

Example 7

Five of the covered yarns obtained in Example 1 were used as warp yarn and one as weft yarn, to obtain a 1 cm×10 cm narrow woven fabric with a thickness of 850 μm in the woven fabric structure shown in FIG. 5.

Figure 9:
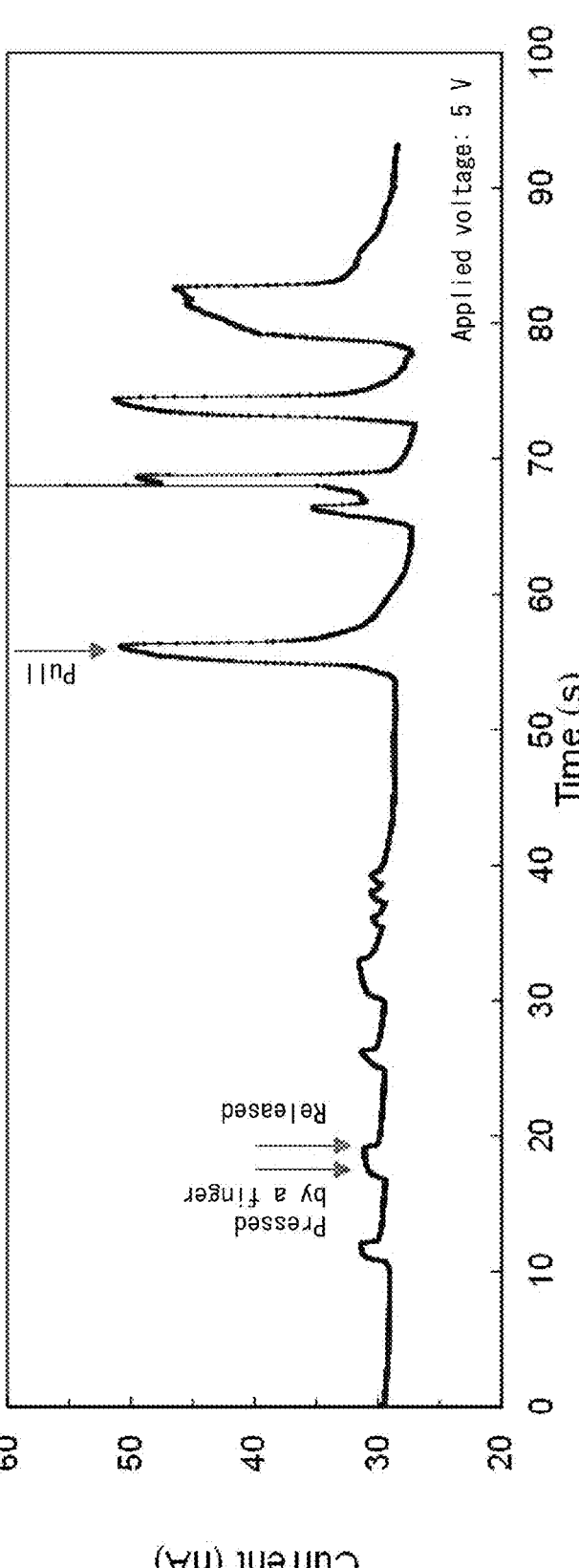
FIG. 9 is a graph showing an example of the relationship between load application time and current value (sensor output) for a sensing member of the embodiment, in the form of a plain weave woven fabric (narrow woven fabric) where the warp yarn and weft yarn are covered yarn which are covered by wrapping a low electrical conductivity fiber as a covering material in one direction around a linear conductor as a core material, in Example 7. Here, the applied load conditions differ from the conditions in Table 1.

FIG. 9 shows the time-dependent change in current value (sensor output) at a section near the intersection of the covered yarns in a woven fabric when it was subjected to the load of a finger and then to tensile force. It was thus judged that the woven fabric was useful as a contact sensing fiber member, and the woven fabric was used for evaluation of the sensing property upon application of a load. Table 1 shows the results of evaluating the contact/load sensing property, feel and moisture sensing property.

Kuraray Co., Ltd.) with a fineness of 100 dtex was used as the covering thread. The number of twists for covering of the sheath thread was 1570 T/m, the number of twists for formation of the plied yarn was 280 T/m, and the fineness of the completed plied yarn was 1270 dtex. The sensor resistance of the plied yarn cut out to a length of 10 cm was 2.1 kΩ, and the resistance value of the linear conductor with a length of 10 cm was 20.0Ω. That is, the proportion of the resistance value and wiring resistance of the plied yarn sensor was approximately 105 times. Table 2 shows the results of evaluating the contact/load sensing property and feel.

Example 9

Plied yarn was produced in the same manner as Example 8, except that the covering thread was 240 dtex carbon Beltron B31 (KB Seiren, Ltd.), the number of twists of the covering for the sheath thread was 653 T/m, and the number of twists for plying was 250 T/m. The fineness of the completed plied yarn was 1260 dtex. The sensor resistance of the plied yarn with a length of 10 cm was 10.0 MΩ, the resistance value of the linear conductor with a length of 10 cm was 20.0Ω, and the proportion of the resistance value and wiring resistance of the plied yarn sensor was approximately $5 \times 10^5$ times. Table 2 shows the results of evaluating the contact/load sensing property and feel.

TABLE 2

| | Core thread (material) | Covering material | Contact/load sensing property | Feel |
|---|---|---|---|---|
| Example 8 (Plied yarn) | Conductive fiber | Fibers with slight conductivity (CRACARBO) | VG | VG |
| Example 9 (Plied yarn) | Conductive fiber | Fibers with slight conductivity (CARBON BELLTRON) | VG | VG |

TABLE 1

| | Core thread (material) | Covering material | Contact/load sensing property | Feel | Moisture sensing property |
|---|---|---|---|---|---|
| Example 1 (Plied yarn) | Conductive fiber | Polyester | VG | VG | VG |
| Example 2 (Plied yarn) | Conductive fiber | Polylactic acid | VG | VG | VG |
| Example 3 (Plied yarn) | Conductive fiber | Nylon | VG | VG | VG |
| Example 4 (Plied yarn) | Metal wire | Polyester | VG | F | VG |
| Comp. Example 1 (Wire twisting) | Conductive fiber | Vinyl resin | P | VG | P |
| Comp. Example 2 (Wire twisting) | Metal wire | TEFLON Resin | P | P | P |
| Example 5 (Narrow woven fabric) | Conductive fiber | Polyester | VG | VG | VG |
| Example 6 (Narrow woven fabric) | Conductive fiber | Polylactic acid | VG | VG | VG |
| Example 7 (Narrow woven fabric) | Conductive fiber | Polyester | VG | VG | VG |

Example 8

Plied yarn was produced in the same manner as Example 1, except that the linear conductor used had 14 filaments, the fineness of the nylon 66 fiber composing the linear conductor was 66 dtex, and CRACARBO (KC-782R B20T4 by

INDUSTRIAL APPLICABILITY

The contact sensing fiber member of the invention can be processed to long lengths, has excellent mass productivity, can be used as warp yarn for woven fabrics or warp knitting and exhibits an excellent pliable feel, and can also be provided at significantly lower cost than contact sensing fiber members (piezoelectric threads) that use conventional piezoelectric materials. Specifically, because the contact sensing fiber member of the invention allows sensing of a load using common fiber materials such as polyester or nylon, without requiring a special piezoelectric material, it is possible to obtain contact sensing fibers at very low cost, and since it employs established covering technology as processing of fibers, it is possible to achieve processing to long lengths and to obtain excellent mass productivity, while also obtaining processed yarn with a highly superior feel compared to piezoelectric yarn, thereby facilitating formation into fiber members such as woven or knitted fabrics.

The contact sensing fiber member of the invention is able to detect the state of continuous application of a load, due to changes not only in electrostatic capacitance but also in the resistance value.

The contact sensing fiber member of the invention can therefore be used for a wide range of purposes, including for smart textiles provided with electrical functional elements on flexible or stretchable fiber base materials, contact sensing woven or knitted fabrics such as rugs that can detect when they are stepped on, anti-theft mats for detecting human entrance or exit, or human counting mats, monitoring sensors at facilities such as nursing or caregiving centers, sensors that digitalize and transmit tactile sensations at production sites such as factories, sensor-embedded members in vehicle seat belts, embedded contact sensors (biosensors) that are embedded into vehicle seat belts, handles or dashboards, detection sensors for detecting the presence or absence of humans, child neglect preventers on back seats, or monitoring sensors.

REFERENCE SIGNS LIST

1 Conductive fiber
2 Piezoelectric material
3 Conductor
4 Prior art piezoelectric yarn
5 Linear conductors as a core material
6 Low electrical conductivity (or insulating) fibers as a covering material (covering yarn)
7 Covered yarns
8 Plied yarn obtaining by plying of covered yarns
9 Core thread (core material)
10 Spindle
11 Bobbin
12 Flyer
13 Flyer cap
14 Covering yarn
15 Flyer drive guide
16 Flyer drive guide
17 Flyer drive guide
18 Flyer drive guide

The invention claimed is:
1. A sensing fiber member, comprising:
a first covered yarn; and
a second covered yarn,
wherein each of the first covered yarn and the second covered yarn includes:
a core material,
a first covering yarn, and
a second covering yarn,
wherein the core material is a linear electroconductive conductor, wherein the first covering yarn and the second covering yarn are each a low electrical conductivity yarn that includes multifilament yarns,
wherein the low electrical conductivity yarn has an electric resistivity of $10^4$ Ω·m to $5 \times 10^9$ Ω·m,
wherein, in the first covered yarn and in the second covered yarn, the first covering yarn and the second covering yarn are wrapped around the core material and a wrapping direction of the first covering yarn and of the second covering yarn is the same,
wherein the first covered yarn and the second covered yarn are plied to form a plied yarn in which the first covered yarn and the second covered yarn are mutually adjacent with the first covered yarn and the second covered yarn having crossing contact points,
wherein, in the plied yarn, the first covered yarn and the second covered yarn are twisted in a twisting direction that is opposite from the wrapping direction of the first covering yarn and the second covering yarn,
wherein each of the first covered yarn and the second covered yarn has a twist coefficient K, represented by the following formula:

$$\text{twist coefficient } K=(SS+SC)^{1/2} \times R \text{ is 7000 to 30,000,}$$

where SS is a fineness (dtex) of the linear electroconductive conductor, SC is a total fineness (dtex) of the low electrical conductivity yarn, and R is a wrapping number of the low electrical conductivity yarn, whereby the wrapping number means a number of twists per meter, and
wherein the sensing fiber member is configured to detect a change in electrical resistance between the linear electroconductive conductors of the first covered yarn and the second covered yarn.

2. The sensing fiber member according to claim 1, wherein an applied force or an applied load on the sensing fiber member results in the change in electrical resistance between the linear electroconductive conductors of the first covered yarn and the second covered yarn.

3. The sensing fiber member according to claim 1, wherein an applied load on the sensing fiber member results in the change in electrical resistance between the linear electroconductive conductors of the first covered yarn and the second covered yarn.

4. The sensing fiber member according to claim 1, wherein a deformation of the sensing fiber member results in the change in electrical resistance between the linear electroconductive conductors of the first covered yarn and the second covered yarn.

5. The sensing fiber member according to claim 4, wherein the deformation is stretching.

6. The sensing fiber member according to claim 4, wherein the deformation is bending.

7. The sensing fiber member according to claim 1, wherein contact with a liquid results in the change in electrical resistance between the linear electroconductive conductors of the first covered yarn and the second covered yarn.

8. The sensing fiber member according to claim 1, wherein a change in humidity results in the change in electrical resistance between the linear electroconductive conductors of the first covered yarn and the second covered yarn.

9. The sensing fiber member according to claim 1, wherein the linear electroconductive conductor is metal fibers.

10. The sensing fiber member according to claim 1, wherein the linear electroconductive conductor is fibers to which conductivity has been imparted.

11. The sensing fiber member according to claim 1, wherein the linear electroconductive conductor is carbon fibers.

12. The sensing fiber member according to claim 1, wherein a wrapping direction of the multifilament yarns of the first covering yarn is the same as a wrapping direction of the multifilament yarns of the second covering yarn.

13. The sensing fiber member according to claim 1, wherein electrical short circuiting between the core material of the first covered yarn and the core material of the second covered yarn is prevented by the first covering yarn and the second covering yarn on each of the first covered yarn and the second covered yarn.

14. The sensing fiber member according to claim 1, wherein the core material of the first covered yarn is covered by respective first covering yarn and second covering and the core material of the second covered yarn is covered by respective first covering yarn and the second covering yarn to prevent electrical short circuiting between the core material of the first covered yarn and the core material of the second covered yarn.

15. The sensing fiber member according to claim 1, wherein the core material of the first covered yarn is a first core material, the core material of the second covered yarn is a second core material, and the first core material and the second core material are the same material.

16. The sensing fiber member according to claim 1, wherein the first covering yarn and the second covering yarn are the same material.

17. A woven fabric in which the sensing fiber member according to claim 1 is interwoven.

18. A knitted fabric in which the sensing fiber member according to claim 1 is knitted.

\* \* \* \* \*